United States Patent [19]
Shimizu et al.

[11] Patent Number: 5,437,828
[45] Date of Patent: Aug. 1, 1995

[54] METHOD FOR MANUFACTURING A SPOOL OF A PHOTOGRAPHIC FILM CASSETTE

[75] Inventors: Makoto Shimizu; Mituru Suzuki; Susumu Sato; Koichi Takahashi; Toshiro Esaki, all of Kanagawa, Japan

[73] Assignee: Fuji Photo Film Co., Ltd., Kangawa, Japan

[21] Appl. No.: 80,515

[22] Filed: Jun. 24, 1993

[30] Foreign Application Priority Data

Jun. 24, 1992 [JP] Japan .................. 4-166420

[51] Int. Cl.$^6$ .............. B29C 65/56; B29C 51/10; B26F 1/02
[52] U.S. Cl. .................. 261/152; 156/261; 264/153; 264/157; 264/163; 264/242; 264/251; 264/555; 425/302.1; 425/504; 425/510; 425/517
[58] Field of Search .............. 264/153, 157, 160, 163, 264/152, 242, 248, 251, 553; 156/261, 262; 425/289, 302.1, 505, 510, 515.517, 504, DIG. 34, 386; 242/71.8, 71.9; 354/275

[56] References Cited

U.S. PATENT DOCUMENTS

| | | | |
|---|---|---|---|
| 2,548,305 | 4/1951 | Gora | 425/511 |
| 2,745,135 | 5/1956 | Gora | 264/153 |
| 2,922,192 | 1/1960 | Morin | 425/510 |
| 3,195,180 | 7/1965 | Jagger et al. | 264/153 |
| 3,240,851 | 3/1966 | Scalora | 264/153 |
| 3,282,762 | 11/1966 | Stolk et al. | 156/261 |
| 3,678,550 | 7/1972 | Zuhlke et al. | 156/261 |
| 4,220,292 | 9/1980 | Mizutani et al. | 242/71.8 |
| 4,421,705 | 12/1983 | Hatakeyama et al. | 264/153 |
| 4,423,943 | 1/1984 | Gold | 354/275 |
| 4,778,551 | 10/1988 | Coffnan | 264/153 |
| 4,796,823 | 1/1989 | Akao et al. | 242/71.8 |
| 4,834,306 | 5/1989 | Robertson et al. | 242/71.1 |
| 4,848,693 | 6/1989 | Robertson | 242/71.1 |
| 5,151,233 | 9/1992 | Wendt | 264/153 |

FOREIGN PATENT DOCUMENTS

| | | |
|---|---|---|
| 0406815A2 | 1/1991 | European Pat. Off. . |
| 362779 | 12/1931 | United Kingdom . |
| 408839 | 7/1932 | United Kingdom . |

*Primary Examiner*—Jay H. Woo
*Assistant Examiner*—Duane S. Smith
*Attorney, Agent, or Firm*—Sughrue, Mion, Zinn, Macpeak & Seas

[57] ABSTRACT

A plurality of shapes each having a fundamental construction of a flange are vacuum formed on a continuous sheet of thermoplastic resin. When blanking each of the formed shapes out of the resin sheet into an individual flange, a spool core is placed coaxially with the formed shape placed in the blanking position. The flange just blanked out of the resin sheet is moved in the blanking direction toward the spool core, to be fit on the spool core. The shapes are formed in a double line along the resin sheet, and thereafter, the resin sheet is slit along the longitudinal direction into two sheet branches each having the formed shapes arranged in a single line. The back side surfaces of the two sheet branches are opposed to each other, and the spool core is disposed between the sheet branches and oriented in a direction perpendicular to the back side surfaces of the sheet branches. The formed shapes are blanked out of the sheet branches in opposite directions toward opposite ends of the spool core.

9 Claims, 6 Drawing Sheets

METHOD FOR MANUFACTURING A SPOOL OF A PHOTOGRAPHIC FILM CASSETTE

BACKGROUND OF THE INVENTION

1. Field of the Invention

The present invention relates to a method and apparatus for manufacturing spools of photographic film cassettes. Particularly the present invention relates to a method and apparatus for manufacturing photographic film cassettes having a spool wherein thin flanges are reliably mounted on a spool core. The present disclosure is based on the disclosure of Japanese Patent Appln. No. 4-166420 filed Jun. 24, 1992.

2. Description of the Related Art

U.S. Pat. No. 4,423,943 discloses a photographic film cassette which contains a roll of photographic film wound on a spool such that a film leader does not initially protrude from a cassette housing and may be advanced to an outside of the cassette housing through a film passage slit by rotating the spool.

In such a photographic film cassette, one of the most significant problems is how to prevent "clock-springing" or loosening of the film roll wound on the spool. To solve this problem, European Patent 0406815A2 (which corresponds to Japanese Laid-Open Patent Application 3037645) and U.S. Pat. Nos. 4,834,306 and 4,848,693 disclose a photographic film cassette wherein a spool has flanges on opposite ends of a spool core and rims of the flanges are deformed toward the outer periphery of a film roll coiled about the spool core to cover opposite ends of the film roll. In this way, the loosening of the film roll is prevented.

For easy deformation, the flanges are favorably formed from a thin flexible material, such as flexible plastics. However, it has been difficult to automatically form thin flanges and mount them on the spool core. If the thin flanges are formed by molding, the flanges cannot be easily removed from the mold due to electrostatic attraction. This reduces the manufacturing efficiency. Furthermore, if a robotic arm or the like is used to mount the flanges on the spool core, it is necessary to control the grasping power of the mechanical hand thereof with extremely high accuracy, due to the fragility of the flanges. Therefore, cassettes having thin flanges have previously been expensive to manufacture.

SUMMARY OF THE INVENTION

In view of the foregoing, a primary object of the present invention is to provide a method of manufacturing a spool of a photographic film cassette which improves the efficiency and reliability of mounting a pair of thin flanges on a spool core.

Another object of the present invention is to provide an inexpensive apparatus for automatic manufacturing a photographic film cassette having thin flanges.

To achieve the above and other objects and advantages, the present invention forms shapes, each having a fundamental construction of a flange, on a continuous sheet of thermoplastic resin, and blanks the formed shapes out of the resin sheet into individual flanges when the shapes formed on the resin sheet are seriatim placed in a blanking position. A spool core is disposed coaxially with each shape placed in the blanking position, and each flange is moved in the blanking direction toward the spool core, to be fit on the spool core subsequent to blanking. The continuous resin sheet is transported continuously from the forming process to the blanking and mounting process, while the spool cores are supplied one after another to the mounting position.

According to a preferred embodiment of the invention, the shapes are formed in a double line along the resin sheet, and thereafter, the resin sheet is slit along the sheet transporting direction into two sheet branches each having the formed shapes arranged in a single line. The back surfaces of the two sheet branches are opposed to each other, and the spool core is disposed between the sheet branches and oriented in a direction perpendicular to the back surfaces of the branches. The formed shapes are blanked out of the sheet branches toward opposite ends of the spool core.

In the method of the present invention, it is unnecessary to accurately control the grasping power of a mechanical hand, and the efficiency of mounting the flanges on the spool core is improved. Moreover, a reliable automatic mounting is achieved at a low cost.

BRIEF DESCRIPTION OF THE DRAWINGS

Other objects and advantages of the present invention will become apparent in the following detailed description of the preferred embodiment when read in connection with the accompanying drawings, wherein like reference numerals designate like or corresponding parts throughout the several views, and wherein.

DETAILED DESCRIPTION OF THE PREFERRED EMBODIMENT

Figure 1:
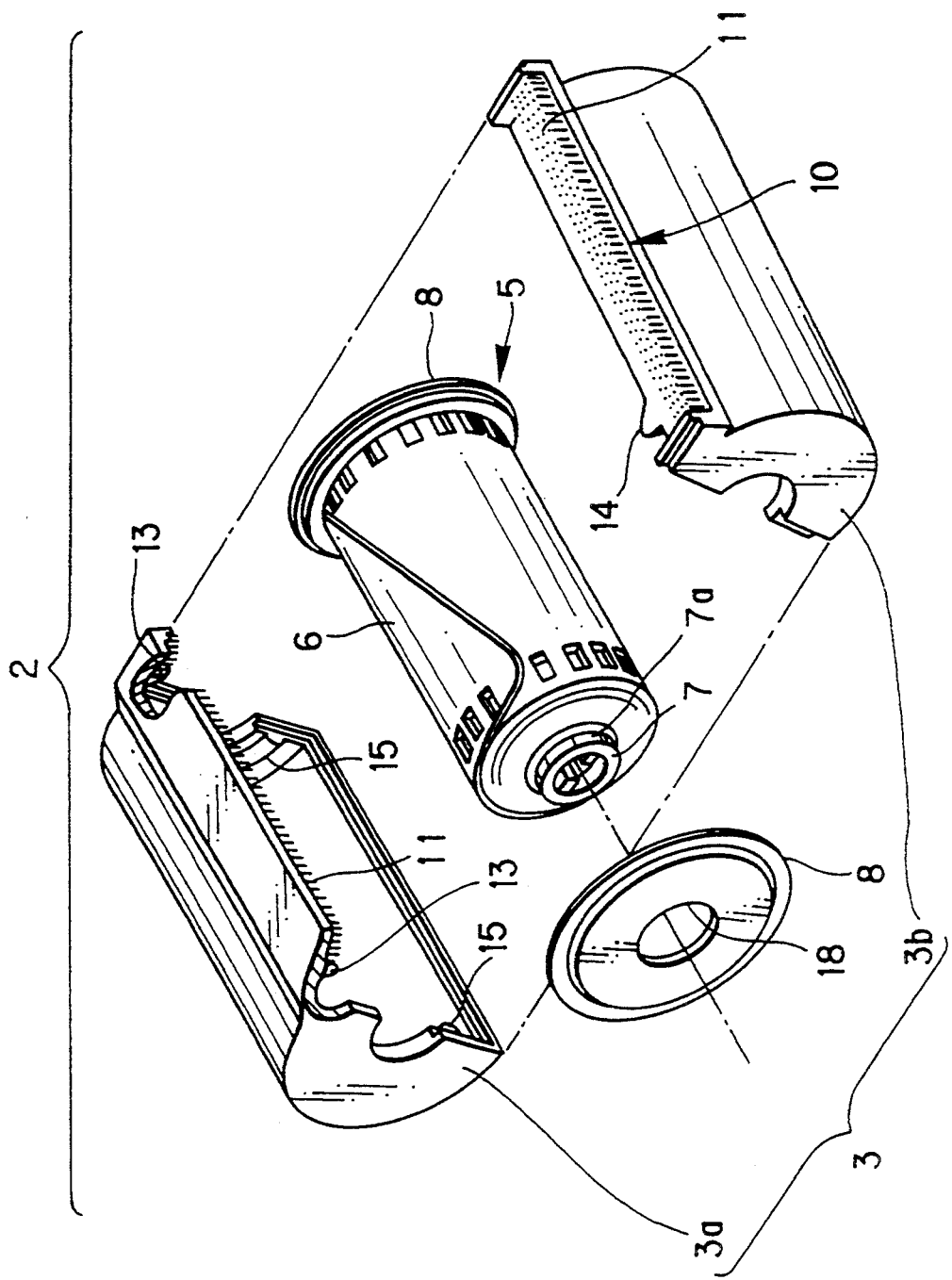
FIG. 1 is an exploded perspective view of a photographic film cassette according to a preferred embodiment of the invention.

FIG. 1 shows a photographic film cassette 2, which is composed of a cassette shell 3 consisting of shell halves 3a and 3b, a spool 5 and a photographic filmstrip 6 wound in a roll on the spool 5. The spool 5 is rotatably mounted in the cassette shell 3 and includes a cylindrical spool core or hub 7 and a pair of identical flanges or disks 8 disposed on opposite ends of the spool core 7. The ends of the spool core 7 have radially inwardly stepped portions 7a formed thereon. The photographic filmstrip (hereinafter referred to as filmstrip) 6 is coiled about the spool core 7 with the lateral sides thereof being confined or aligned by the flanges 8. An inner or trailing end of the filmstrip 6 is attached to the spool core 7.

The cassette shell 3 has a film passage slit 10 formed therein for the filmstrip 6 to pass therethrough. A light-trapping member, or plush material 11, is provided on the inner walls of the film passage slit 10 which are defined by the shell halves 3a and 3b. The photographic film cassette 2 further includes a film leader guiding device for guiding the filmstrip 6 to the outside of the cassette shell 3 through the film passage slit 10 when the spool 5 is rotated in a film unwinding direction.

The film leader guiding device includes a pair of spreaders or guide projections 13 which are formed on the inner wall of the shell half 3a in the vicinity of the film passage slit 10, and are spaced axially from each other in correspondence with the flanges 8. The spreaders 13 come into contact with limited circumferential portions of the flanges 8 to deflect the limited circumferential portions axially away from each other, for releasing the film from confinement by the flanges 8.

The film leader guiding device also includes a separating claw 14 formed on the shell half 3b at a position which is inward of the film passage slit 10, for peeling a leading end of the filmstrip 6 off the next inward succeeding convolution of the film roll 6 and guiding the leading end toward the film passage slit 10. The film leader guiding device further includes a pair of ridges 15 formed on the lateral walls of the shell half 3a and disposed at portions thereof which are remote from the film passage slit 10. The ridges 15 press the flanges 8 against opposite end faces of the film roll 6.

Figure 2:
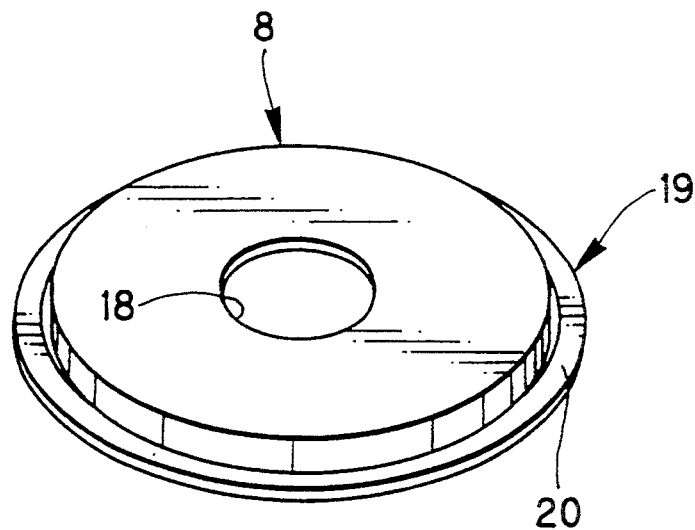
FIG. 2 is a perspective view of a flange of a spool of the photographic film cassette shown in FIG. 1.
Figure 3:
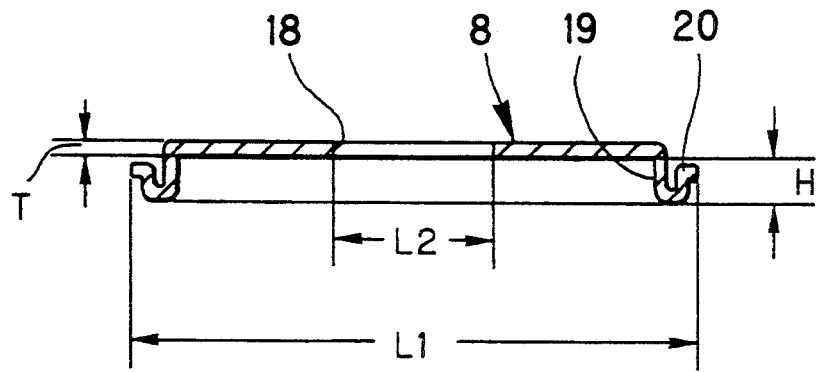
FIG. 3 is a cross section of the flange shown in FIG. 2.

The flanges 8 are each formed as an integral element, as shown in FIGS. 2 and 3. The flanges 8 have respective central holes 18 formed thereon for receiving the ends or stepped portions 7a of the spool core 7. The flanges 8 also have respective annular lips 19 formed on the circumferential portion thereof. The lips 19 extend over the lateral edges of the outermost convolution of the film roll 6 to prevent the film roll 6 from radially expanding or clock-springing. Each of the lips 19 has a J-shaped cross section, as shown in FIG. 3, and has an annular brim 20 which is inclined radially outwardly from other portions of the flange 8. The flanges 8 are thin and are formed from a thermoplastic resin material or the like. For instance, the flanges 8 can be 20 mm in diameter L1, 1.8 mm in height H and 0.3 mm in thickness T, and the hole 18 can be 8 mm in diameter L2.

Figure 4:
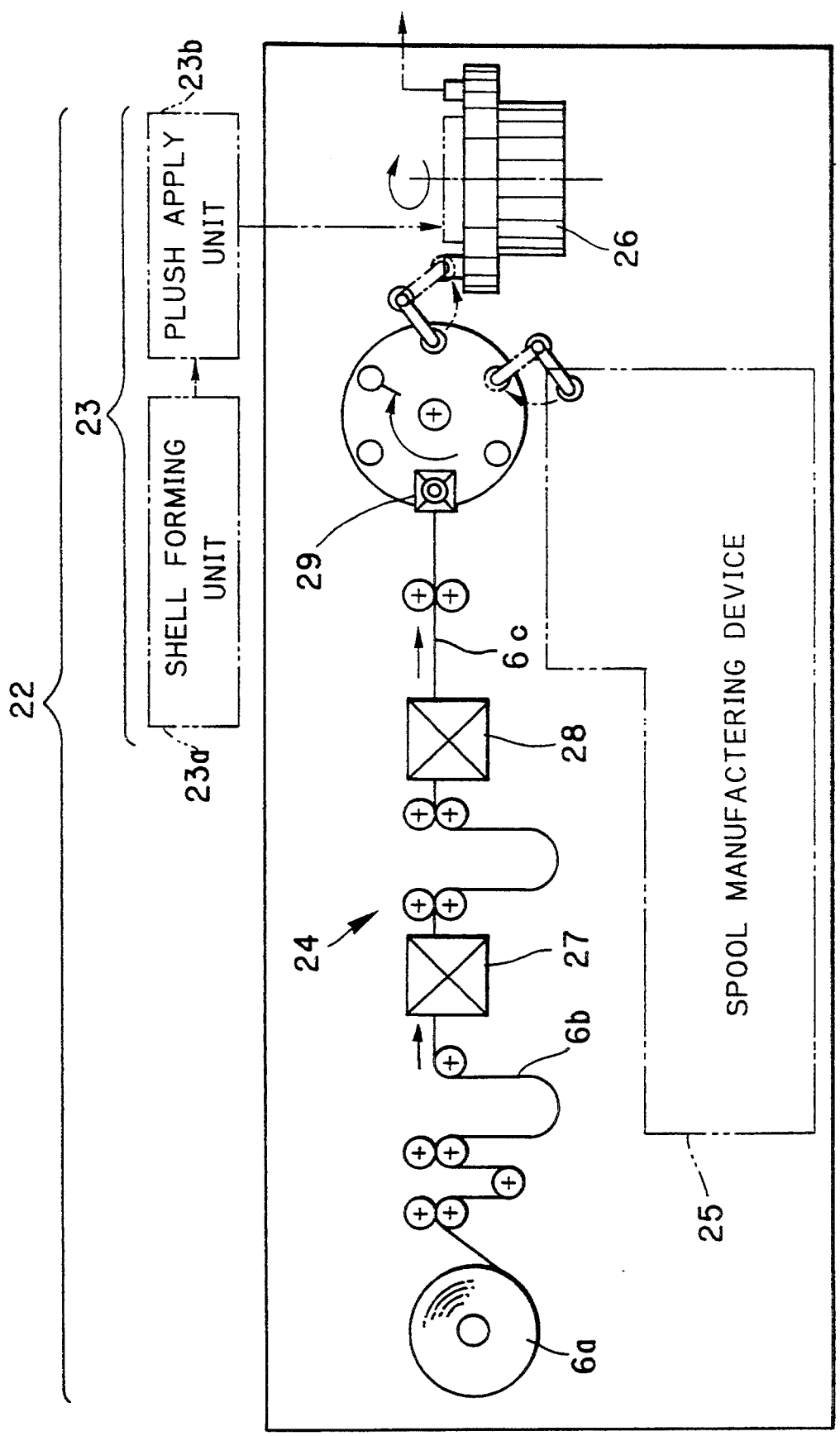
FIG. 4 schematically shows the overall construction of an apparatus for manufacturing photographic film cassettes according to a preferred embodiment of the invention.

As shown in FIG. 4, the photographic film cassette 2 is automatically manufactured by means of a cassette manufacturing apparatus 22, which is constructed of a cassette shell manufacturing device 23, a film roll manufacturing device 24, a spool manufacturing device 25 and an assembling device 26.

The cassette shell manufacturing device 23 is constituted of a shell forming unit 23a for forming the shell halves 3a and 3b, and a plush applying unit 23b for applying the light-trapping member 11 on the shell halves 3a and 3b. The shell halves 3a and 3b with the respective light-trapping members 11 are fed to the assembling device 26.

A bulk roll 6a of a continuous strip 6b of semi-fabricated photographic film is disposed in the film roll manufacturing device 24. A perforator 27 forms perforations in the continuous strip 6b, and thereafter, a cutter 28 cuts the film strip 6b into individual filmstrips 6c each having a predetermined length. Each filmstrip 6c is transported to a spool winder 29, which winds the filmstrip 6c on the spool 5 which is previously supplied from the spool manufacturing device 25 to the film roll manufacturing device 24. The film roll 6 wound on the spool 5 is transported to the assembling device 26, to be mounted in the cassette shell 3. Thereafter, the shell halves 3a and 3b of the respective cassette shell 3 containing the film roll 6 therein are fixedly joined to each other by ultrasonic welding. The photographic film cassette 2 can then be subjected to known decorating and finishing processes.

Figure 5:
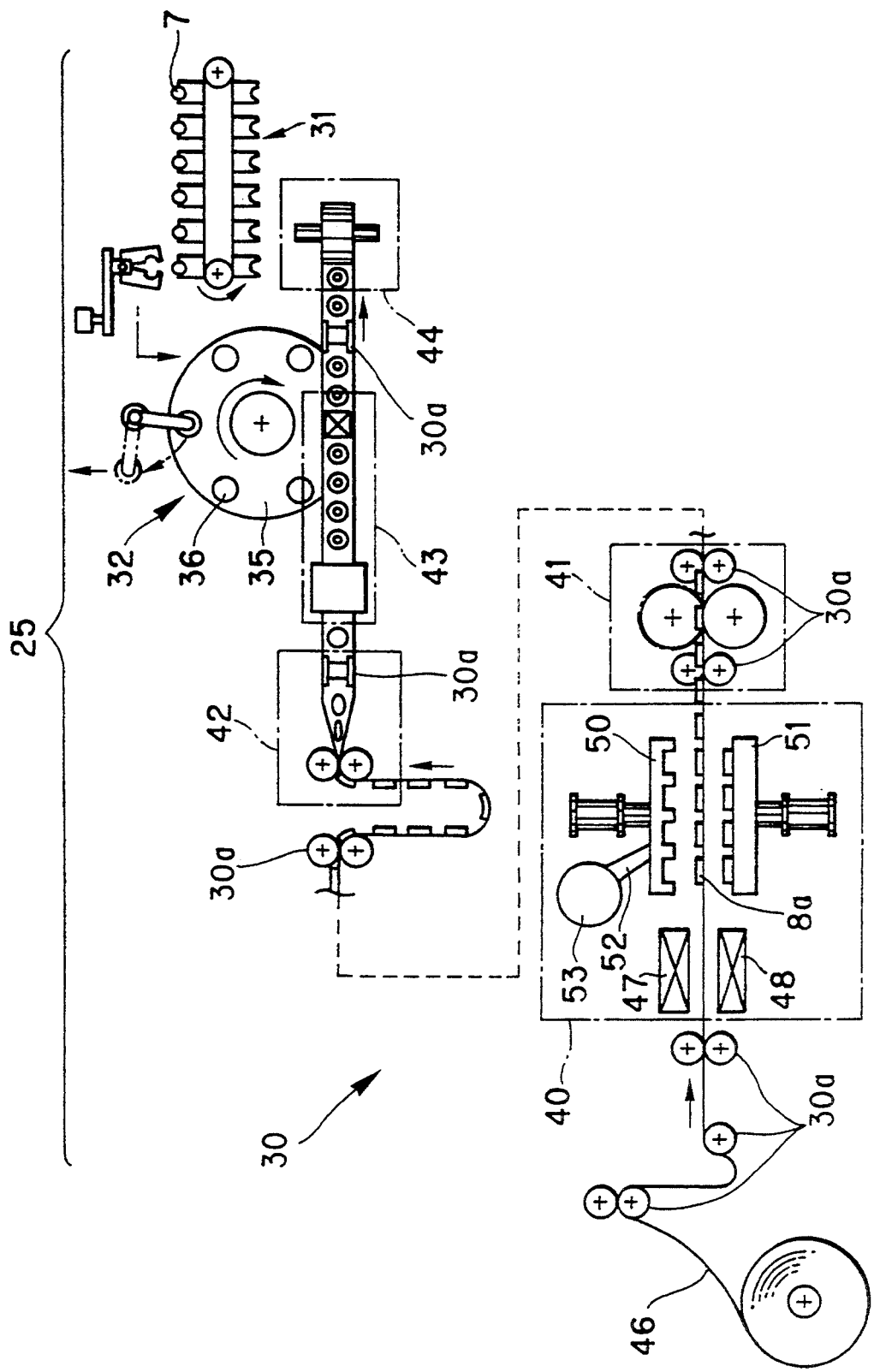
FIG. 5 schematically shows the spool manufacturing device included in the apparatus shown in FIG. 4.

As illustrated in FIG. 5, the spool manufacturing device 25 is constituted of a flange manufacturing line 30, a spool core supply line 31 and a spool assembling station 32. The spool core supply line 31 supplies the spool assembling station 32 with the spool cores 7 which are previously formed from a resin material in an appropriate process not shown in the drawings. In the spool assembling station 32, a spool core holer 35 is rotatable in a direction of the arrow. The spool core holder 35 has a plurality of spool core receiving portions 36 which are disposed around the rotational center of the spool core holder 35 and spaced at regular intervals. Each of the spool core receiving portions 36 holds one of the spool cores 17 so that longitudinal axes of the spool cores 7 are parallel to the rotational axis of the spool core holder 35.

The flange manufacturing line 30 includes vacuum forming device 40, sheet slitting device 41, sheet twisting device 42, punching device 43 and sheet recovery device 44. A continuous sheet 46 of thermoplastic resin is transported by a conveyor through the flange manufacturing line 30 to be sequentially subjected to processing. The conveyor system is illustrated by rollers 30a in the drawings but can be any appropriate device such as a series of endless belts, or the like. The resin sheet 46 is, for example, a sheet of polyethylene having the thickness of 0.3 mm and the width of 1000 mm. For example, the polyethylene sheet 46 is constituted of corton 8000 (high-density polyethylene) having a melt index (MI) of 1.0. Such a melt index value indicates a flowability of the resin which yields adequate strength.

The resin sheet 46 is first fed to the vacuum forming device 40, wherein the resin sheet 46 is heated to 200° C. for 10 seconds by a pair of heaters 47 and 48. The resin sheet 46 thus heated and softened is subjected to vacuum forming using a pair of molds 50 and 51, and a vacuum pump 53 connected to the upper mold 50 through a suction hose 52. The upper and lower molds 50 and 51 are designed to simultaneously form a plurality of vacuum formed shapes on the resin sheet 46, which are arranged in two columns and 23 rows along the longitudinal or transporting direction of the resin sheet 46. Each of the formed shapes constitutes a fundamental construction of the flange 8.

When vacuum forming, the vacuum pump 53 sucks the resin sheet 46 to bring it into tight contact with the upper mold 50, which is heated to 80° C. The lower mold 51 is raised to press the resin sheet 46 against the upper mold 50 after the suction is continued for five seconds following the contact of the resin sheet 46 with the upper mold 50.

Although the resin sheet 46 is pressed between the molds 50 and 51 for improving moldability after being vacuum formed, the lower mold 51 may be omitted for reducing the complexity and cost of preparing the mold. Although the resin sheet 46 is subjected to vacuum forming, it may also be formed through a different process such as air-pressure forming or heat-press forming, for example.

Figure 6:
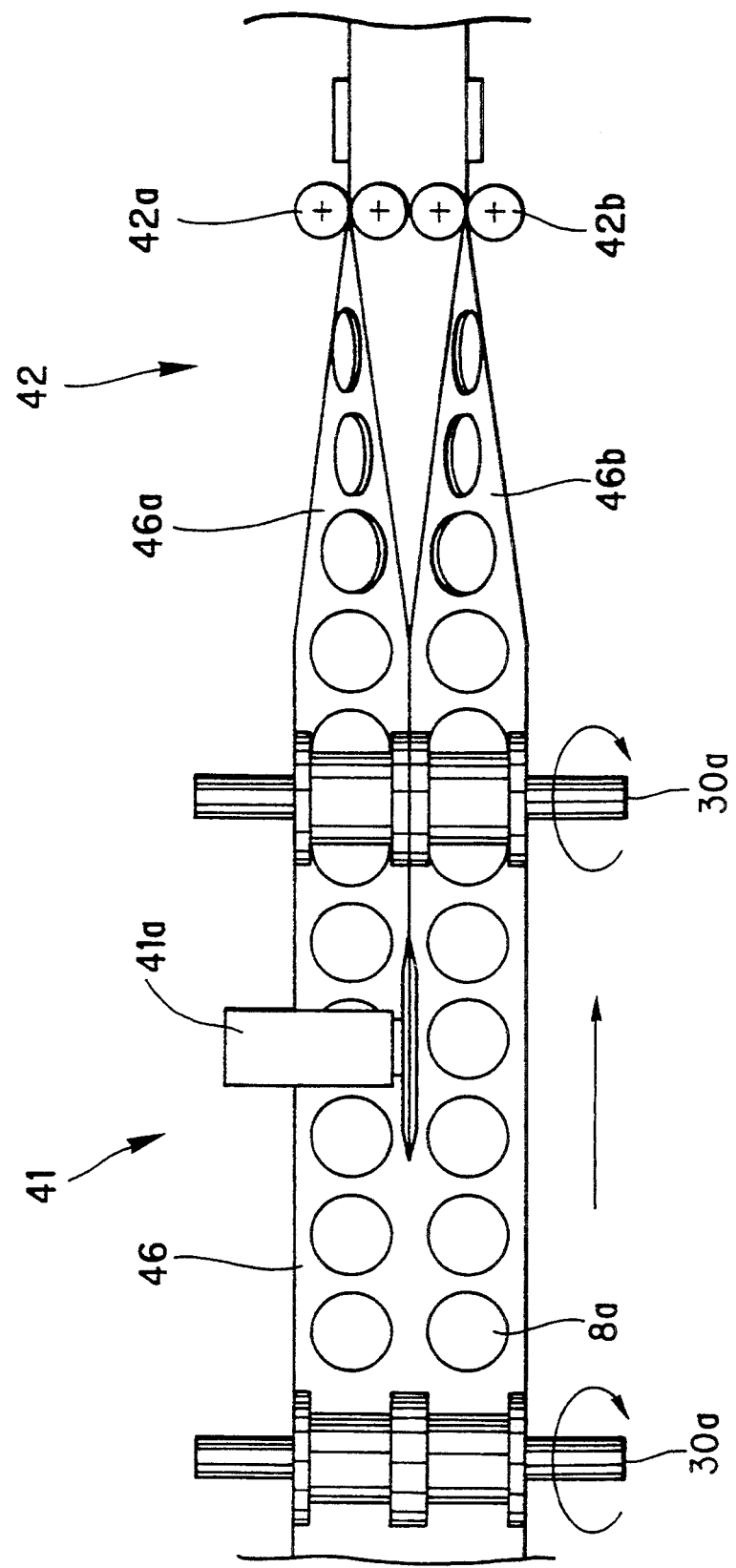
FIG. 6 illustrates the cutting process in the spool manufacturing device shown in FIG. 5.

In the sheet slitting device 41, the resin sheet 46 is slit by a slitter 41a into two sheet branches 46a and 46b each having one column of the vacuum formed shapes arranged in the longitudinal direction (see FIG. 6). Each of the consequent two sheet branches 46a and 46b is twisted through a 90° angle by one of two pairs of rollers 42a and 42b in the sheet twisting device 41. Accordingly, the back surfaces of the sheet branches 46a and 46b are transported in parallel to each other in this condition in the blanking device 43.

Figure 7:
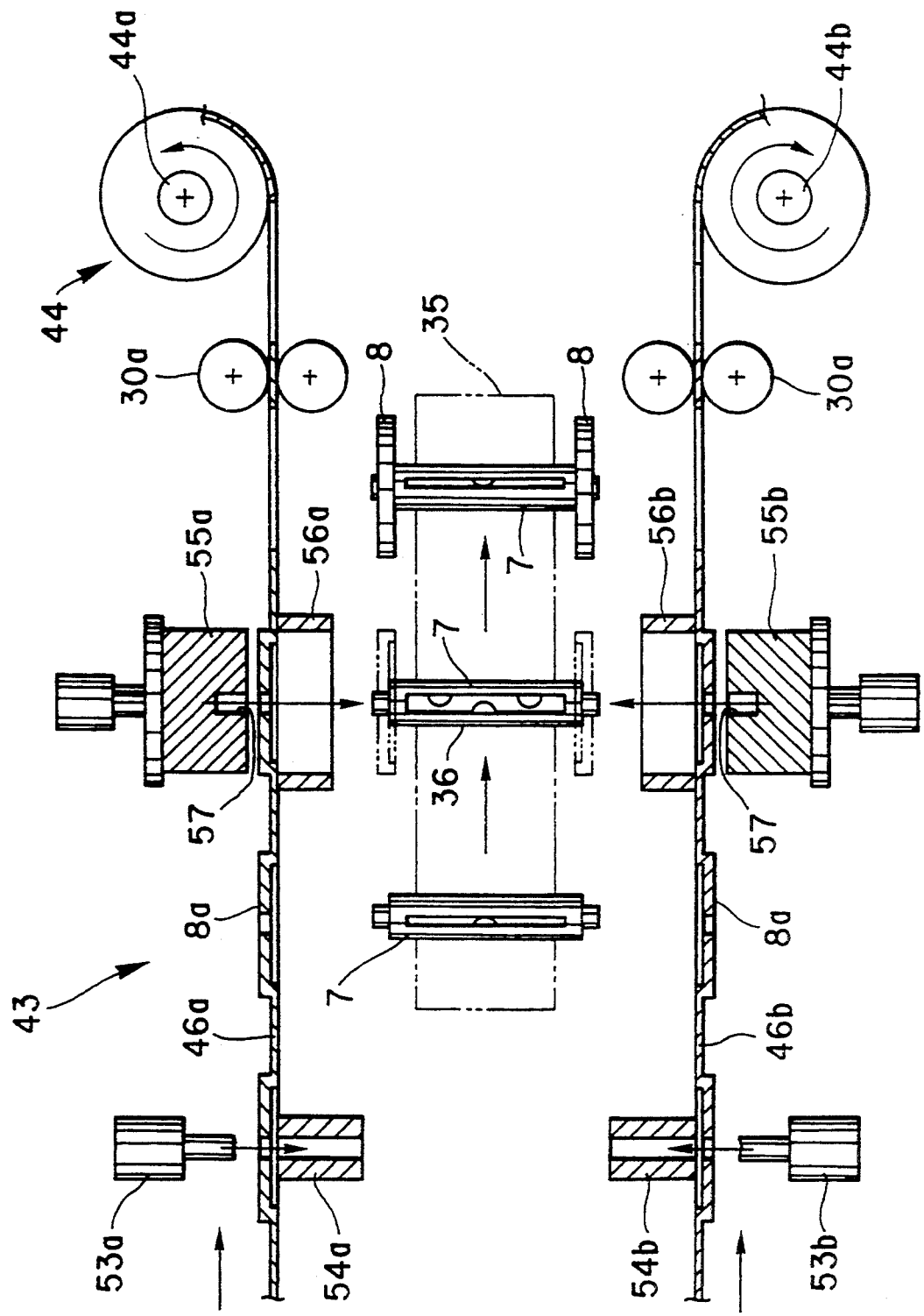
FIG. 7 illustrates the punching process in the spool manufacturing device shown in FIG. 6.

For the blanking device 43 as shown in FIG. 7, a pair of punch and stationary dies 53a, 54a and 53b, 54b are disposed on both sides of each of the sheet branches 46a and 46b, respectively. Particularly, the stationary dies 54a and 54b are respectively disposed on the back sides of the sheet branches 46a and 46b. Each time on the formed shapes on the first sheet branch 46a is positioned coaxially with the die 54a, the punch 53a is moved, by a solenoid device, or the like, toward the die 54a as shown by an arrow, to punch the first sheet branch 46a. Thereby the central holes 18 are formed in the respective formed shapes. In the same way, the central holes 18 are successively punched out in the second sheet branch 46b by using the punch 53b and the die 54b.

After each set of the punch and die 53a, 54a and 53b, 54b, a punch and die pair 55a, 56a and 55b, 56b are provided for blanking the flanges 8 out of the sheet branches 46a and 46b, respectively. The dies 56a and 56b are affixed at predetermined positions. Each time the center of one of the formed shapes on the first sheet branch 46a is positioned coaxially with the die 56a, the punch 55a is moved, by a solenoid, or the like, from the outside of the first sheet branch 46a inwardly to the die 56b, as shown by an arrow in FIG. 7, to blank the formed shape out of the first sheet branch 46a into the individual flange 8. In the same way, the second sheet branch 46b is blanked by the punch 55b and die 56b to produce the flange 8. Of course, the positioning of the sheet branches can be accomplished by virtue of known detection devices such as photoelectric sensors, optical encoders, or the like. Control can be accomplished through a micro-processor based device coupled to the sensors.

Between the sheet branches 46a and 46b, and the dies 56a and 56b, the spool core holder 35 is disposed in such a way that the rotational axis thereof is parallel to the blanking motion direction of the punches 55a and 55b. The above-described blanking operation is effected when the spool core 7 held in one of the spool core receiving sections 36 of the spool core holder 35 is seriatim placed in a position coaxial with the punches 55a and 55b.

The flanges 8 just blanked out of the sheet branches 46a and 46b are pushed by the punch 55a and 55b along the blanking direction toward the spool core 7, thereby to fit the central holes 18 of the respective flanges 8 onto the opposite ends 7a of the spool core 7 that is positioned coaxially with the punches 55a and 55b. A recess 57 is formed in the center of an end face of each of the punches 55a and 55b to permit fitting the flanges 8 onto the spool core 7.

After the flanges 8 are blanked out, the sheet branches 46a and 46b are respectively wound on recovery reels 44a and 44b in the recovery process 44.

Although the resin sheet 46 for forming the flanges 8 is a continuous polyethylene sheet in the above-described embodiment, the flanges 8 may be formed from any other appropriate material. Also, it is possible to add an additive agent or lubricant in the polyethylene sheet. Examples of the additive agent are fluorine powder, silicone oil, carbon fiber, molybdenum disulfide, graphite, and potassium titanate. Examples of the lubricant are silicone oil, higher fatty acid amides such as oleic acid amide and erucic acid amide, metallic salts of higher fatty acid amide such as zinc stearate, higher alcohol ester, and fatty acid ester of polyvalent alcohol ester.

Also, control of the process can be accomplished with known sensors coupled to a microprocessor based control device.

Although the present invention has been described with respect to a method for manufacturing spools of photographic film cassettes of leader advancing type as shown in the drawings, it is possible to apply the invention to the manufacturing of spools of other types of photographic film cassettes.

Thus, the present invention is not to be limited to the above-described embodiments, but on the contrary, various modification may be used without departing from the scope of the invention as defined by the appended claims.

What is claimed is:

1. A method of manufacturing a spool of a photographic film cassette wherein said spool is rotatable within a cassette housing and constructed of a spool core for winding a photographic filmstrip thereon and a pair of identical flanges mounted on opposite ends of said spool core, said method comprising the steps of:
   forming a plurality of shapes on a sheet of thermoplastic resin, each of said shapes constituting a fundamental construction of said flange, said shapes include an annular circumferential lip, said lip extending axially inwardly to contact with an outer periphery of a roll of said photographic filmstrip coiled about said spool core when said flanges are mounted on the opposite ends of said spool core;
   placing said spool core in a first position;
   placing one of said shapes formed on said thermoplastic resin sheet in a second position wherein said one of said shapes is coaxial with said spool core placed in said first position;
   punching holes of said flanges out of said thermoplastic resin sheet in the center of each of said shapes, portions of said spool core extending through said holes when said flanges are mounted on said spool core.
   blanking said one of said shapes out of said thermoplastic resin sheet into an individual one of said flanges from said second position in a direction which is toward said spool core which is in said first position; and
   moving said individual one of said flanges in the blanking direction in succession to said blanking step, to mount said individual one of said flanges onto said spool core.

2. A method of manufacturing a spool of a photographic film cassette wherein said spool is rotatable within a cassette housing and constructed of a spool core for winding a photographic filmstrip thereon and a pair of identical flanges mounted on opposite ends of said spool core, said method comprising the steps of:
   forming a plurality of shapes on a sheet of thermoplastic resin, each of said shapes constituting a fundamental construction of said flange;
   placing said spool core in a first position;
   placing one of said shapes formed on said thermoplastic resin sheet in a second position wherein said one of said shapes is coaxial with said spool core placed in said first position;
   punching holes of said flanges out of said thermoplastic resin sheet in the center of each of said shapes, portions of said spool core extending through said holes when said flanges are mounted on said spool core;

blanking said one of said shapes out of said thermoplastic resin sheet into an individual one of said flanges from said second position in a direction which is toward said spool core which is in said first position;

moving said individual one of said flanges in the blanking direction in succession to said blanking step, to mount said individual one of said flanges onto said spool core; and forming film leader guiding means for guiding a film leader of said roll of said photographic filmstrip to an outside of said cassette housing when said spool is rotated in an unwinding direction.

3. A method of manufacturing a spool of a photographic film cassette wherein said spool is rotatable within a cassette housing and constructed of a spool core for winding a photographic filmstrip thereon and a pair of identical flanges mounted on opposite ends of said spool core, said method comprising the steps of:

A. forming a plurality of shapes on a sheet of thermoplastic resin, said plurality of shapes being arranged in a double line along a longitudinal direction of said thermoplastic resin sheet, and each of said shapes constituting a fundamental construction of said flange;

B. slitting said thermoplastic resin sheet, along a longitudinal direction thereof, into first and second sheet branches, each of said sheet branches having said shapes arranged in a line along a longitudinal direction thereof;

C. positioning said first and second sheet branches so that flat sides thereof are in opposition to each other;

D. placing said spool core in a first position between said first and second sheet branches;

E. placing a first one of said shapes formed on said first sheet branch in a second position wherein said first shape is coaxial with said spool core which is in said first position;

F. placing a second one of said shapes formed on said second sheet branch in a third position wherein said second shape is coaxial with said spool core which is in said first position;

G. blanking said first and second shapes out of said first an second sheet branches into first and second ones of said flanges, respectively, after said placing steps E and F, said blanking of said first and second shapes being performed in opposite blanking directions toward said spool core which is in said first position; and H. moving said first and second flanges in the respective blanking directions in succession to said blanking step, to fit said first and second flanges onto opposite ends of said spool core.

4. A method as recited in claim 3, further comprising the step of:

punching holes of said flanges out of said thermoplastic resin sheet in the center of each of said shapes before said blanking step, portions of said spool core extending through said holes when said flanges are fitted on said spool core.

5. A method as recited in claim 4, wherein, in said forming step, said shape includes an annular circumferential lip, said lip extending axially inwardly to contact with an outer periphery of a roll of said photographic filmstrip coiled about said spool core when said flanges are mounted on opposite ends of said spool core.

6. A method as recited in claim 4, further comprising the step of forming film leader guiding means for guiding a film leader of said roll of said photographic filmstrip to the outside of said cassette housing when said spool is rotated in an unwinding direction.

7. A method as recited in claim 6, wherein said forming step includes vacuum forming.

8. A method as recited in claim 7, wherein said thermoplastic resin sheet is composed of polyethylene.

9. A method as recited in claim 8, wherein said flanges are formed to have a thickness of 0.3 mm.

* * * * *